Jan. 8, 1952     R. E. BOYDEN ET AL     2,581,624
EARLY FACTOR MECHANISM

Original Filed Nov. 19, 1946     10 Sheets-Sheet 1

INVENTORS
ROBERT E. BOYDEN
BY EDWARD P. DRAKE

ATTORNEY

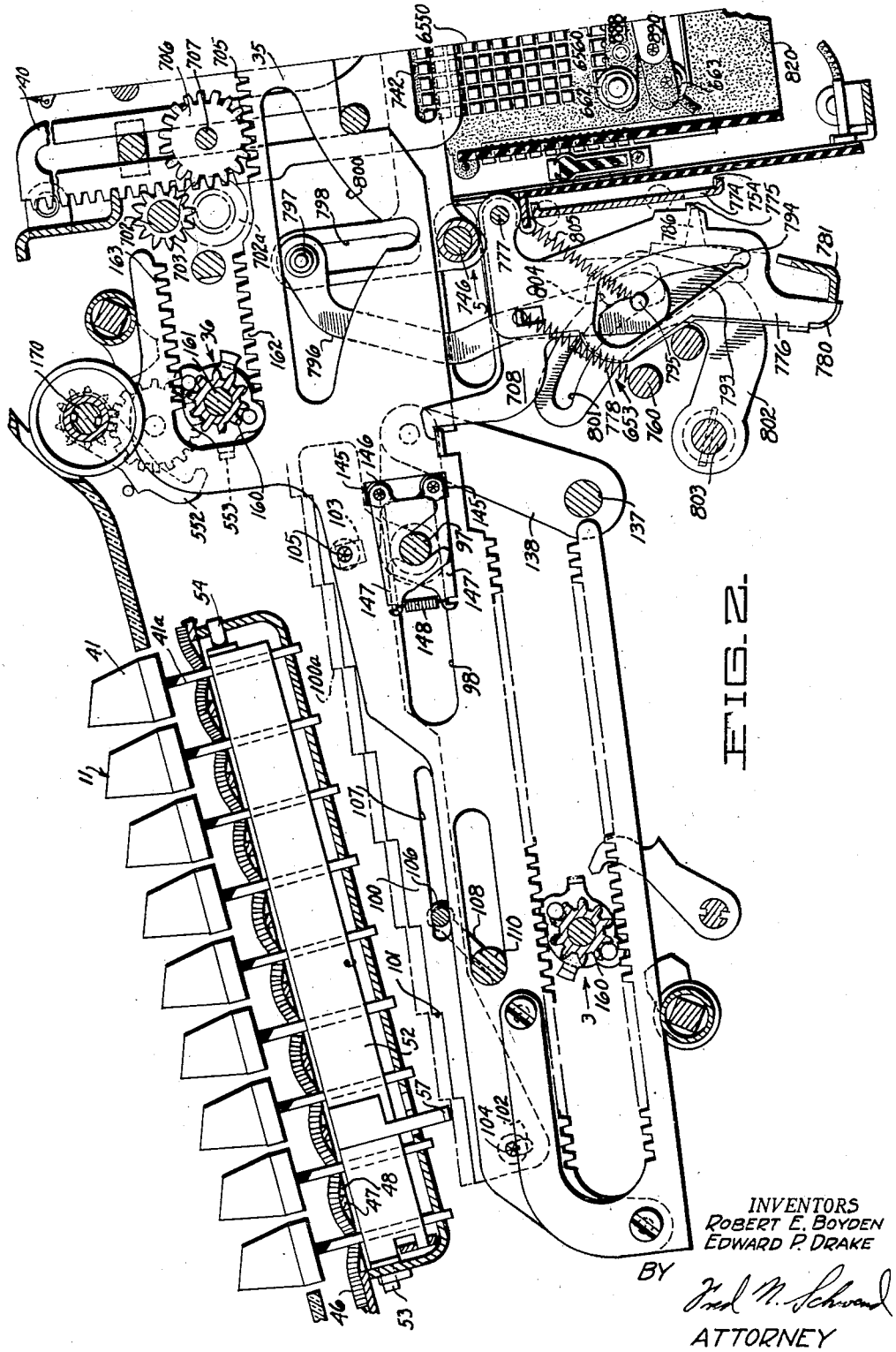

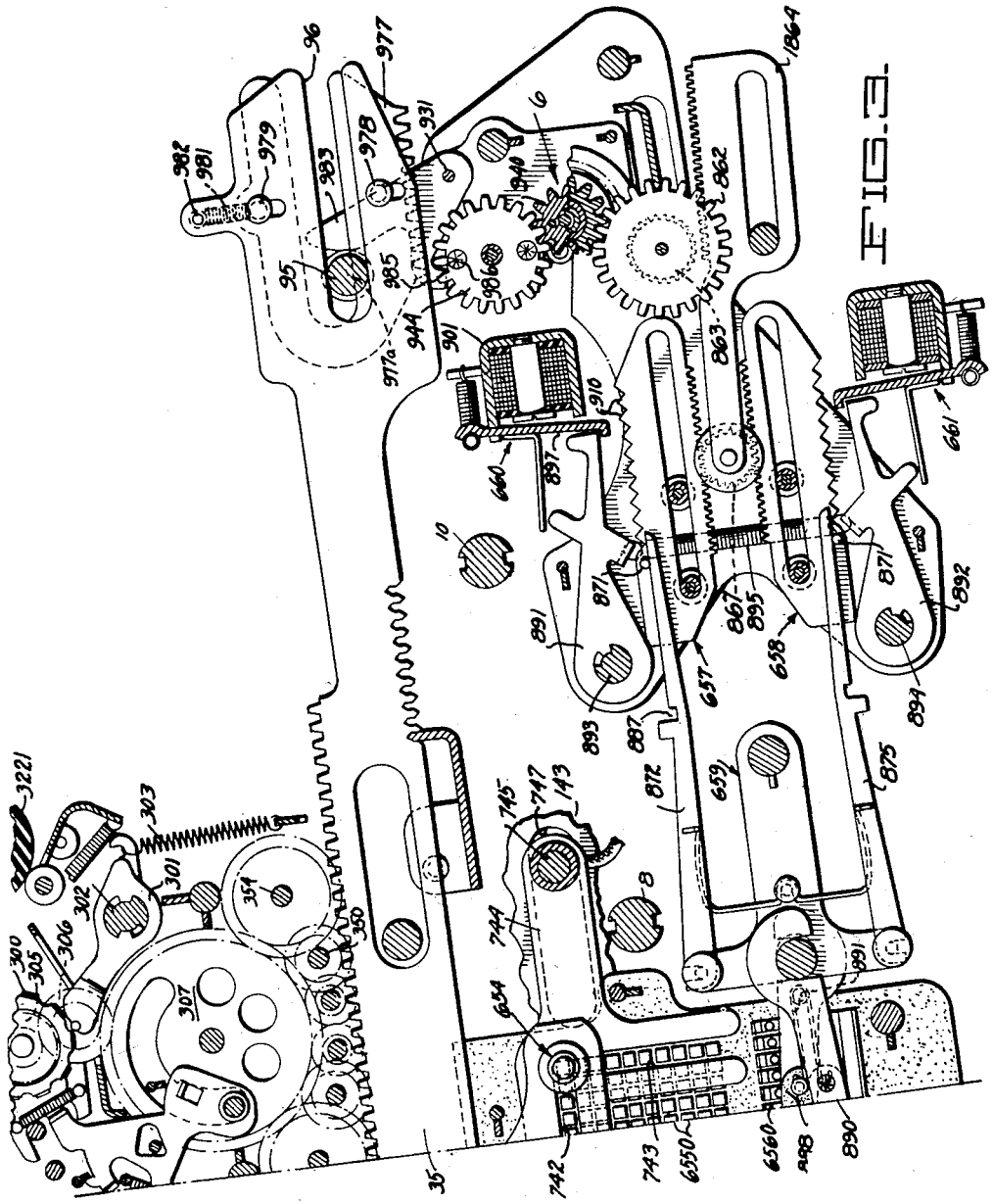

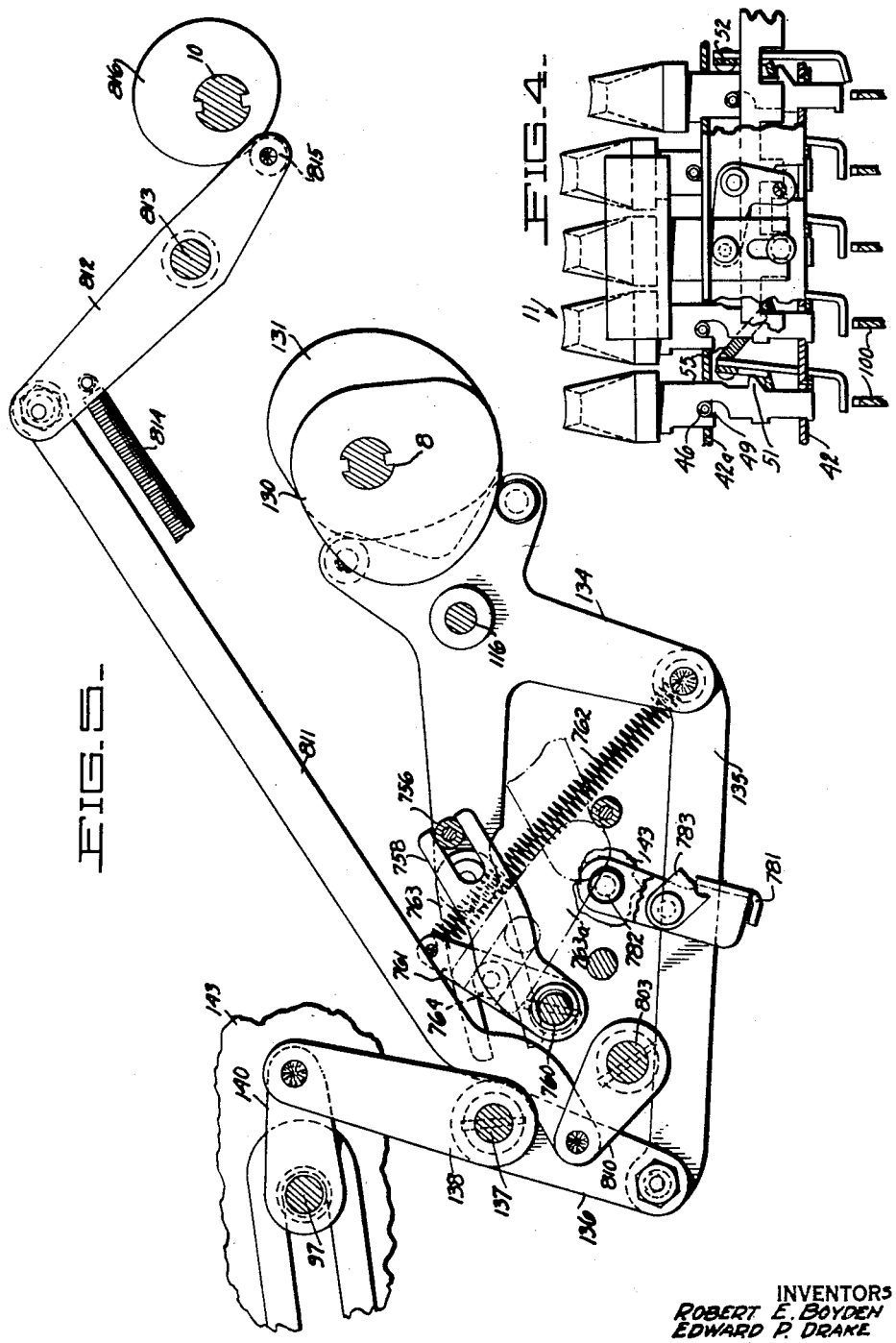

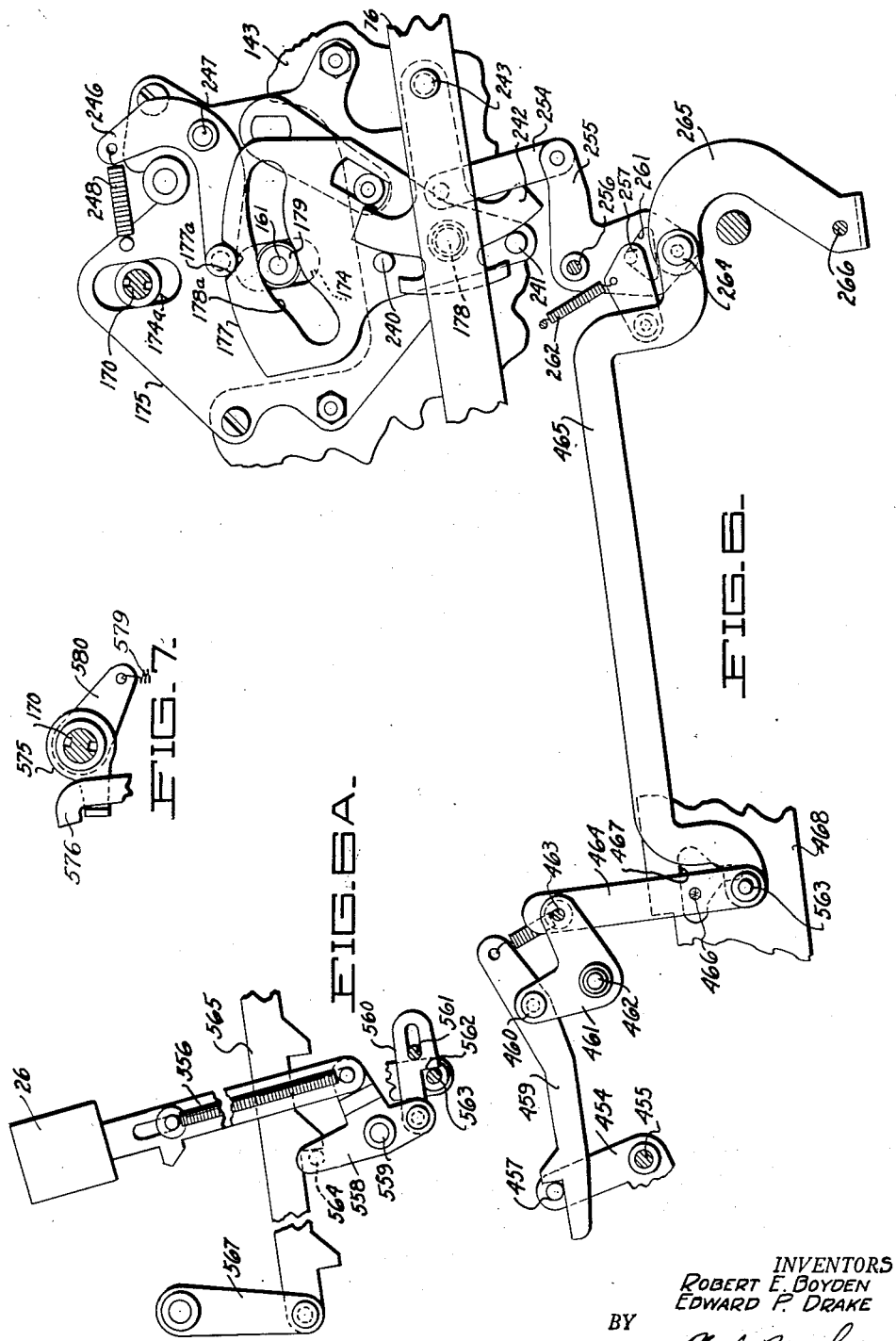

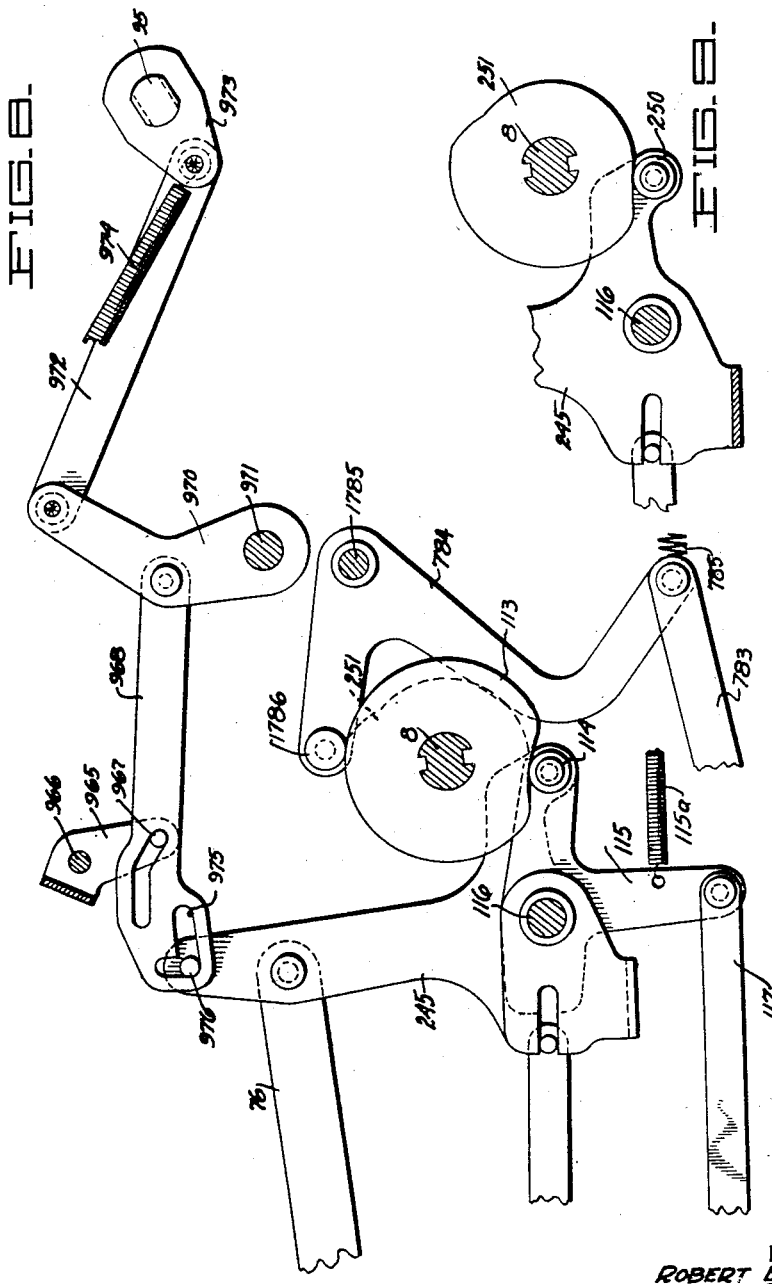

Jan. 8, 1952 R. E. BOYDEN ET AL 2,581,624
EARLY FACTOR MECHANISM
Original Filed Nov. 19, 1946 10 Sheets-Sheet 7

INVENTORS
ROBERT E. BOYDEN
EDWARD P. DRAKE
BY
ATTORNEY

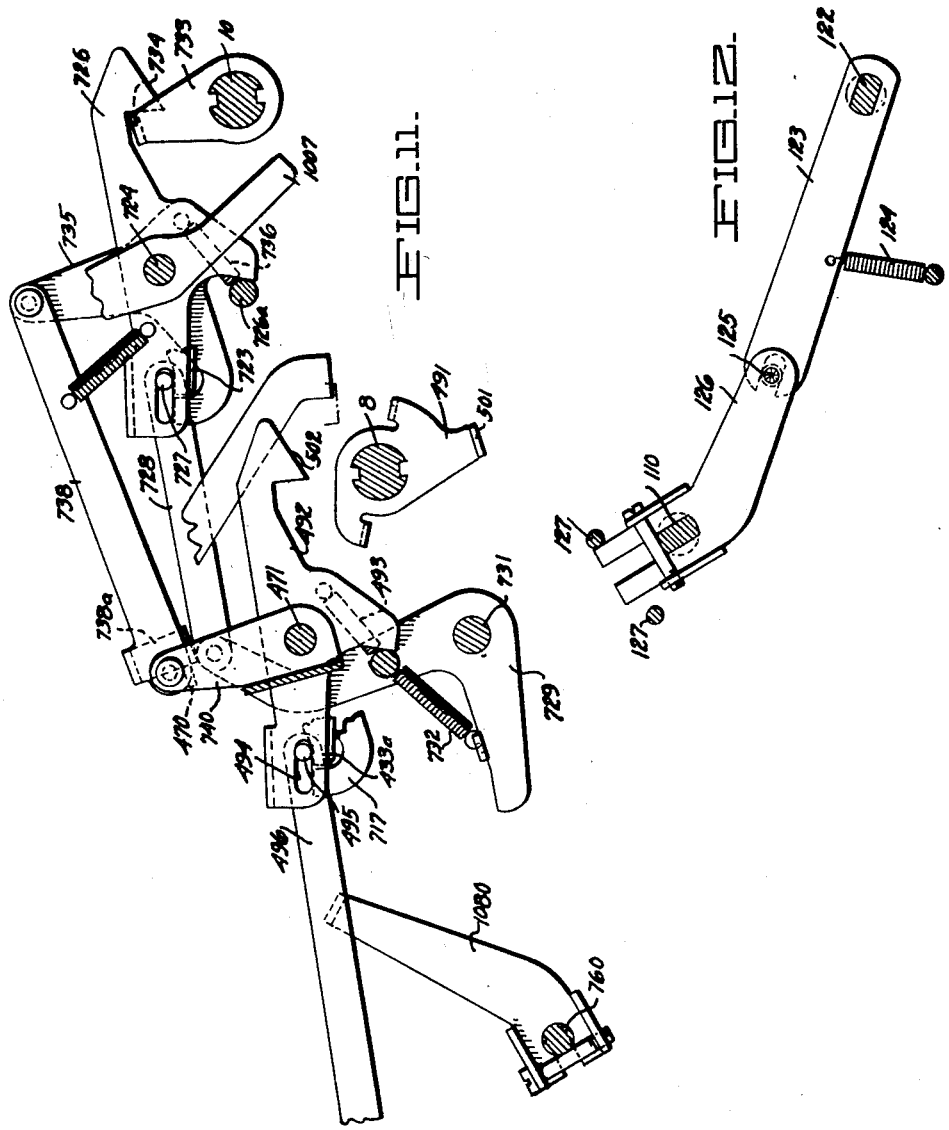

Jan. 8, 1952 R. E. BOYDEN ET AL 2,581,624
EARLY FACTOR MECHANISM
Original Filed Nov. 19, 1946 10 Sheets-Sheet 9
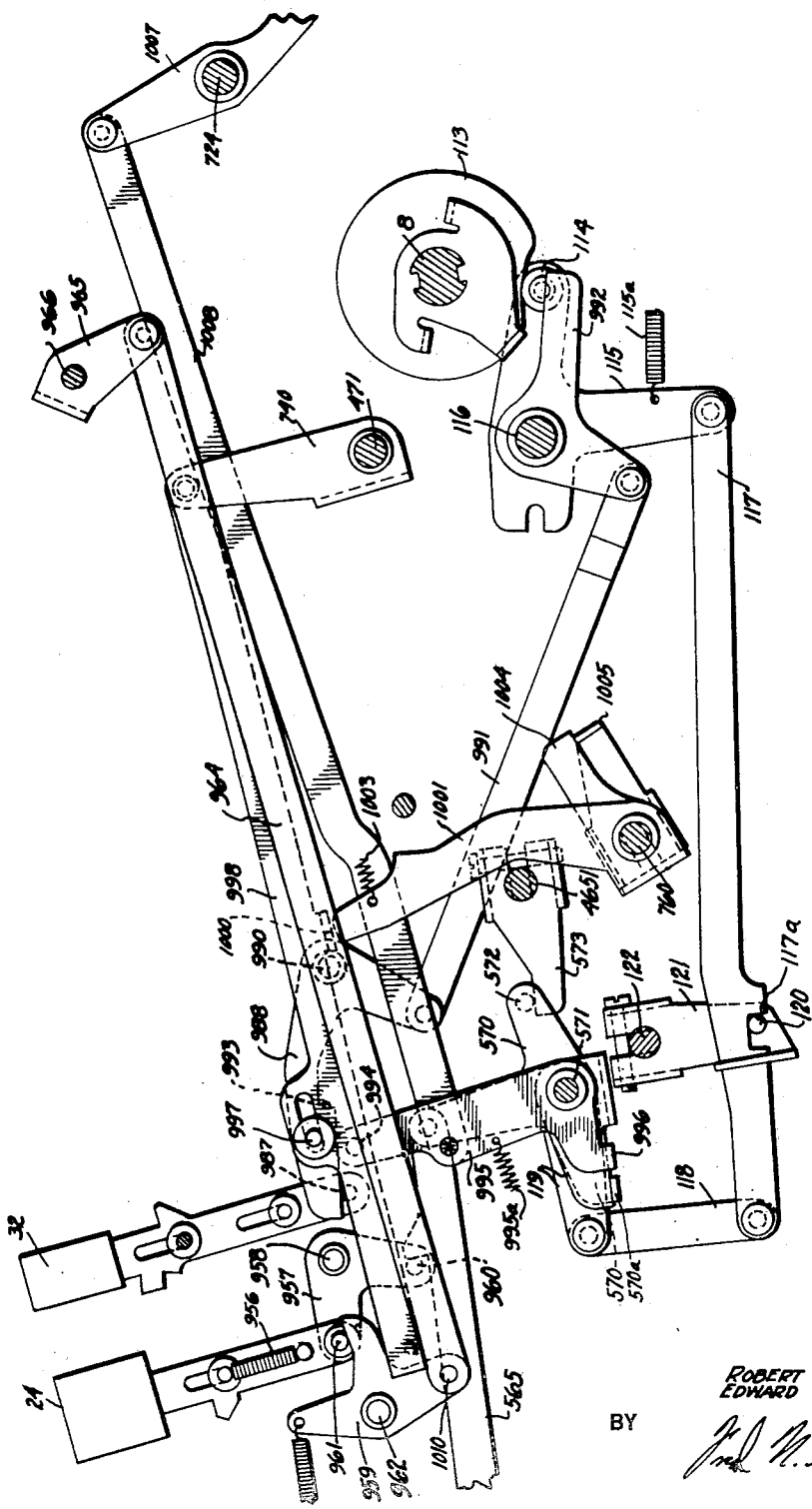
INVENTORS
ROBERT E. BOYDEN
EDWARD P. DRAKE
BY
ATTORNEY Jan. 8, 1952     R. E. BOYDEN ET AL     2,581,624
EARLY FACTOR MECHANISM Original Filed Nov. 19, 1946     10 Sheets-Sheet 10

INVENTORS
ROBERT E. BOYDEN
EDWARD P. DRAKE
BY
ATTORNEY

Patented Jan. 8, 1952

2,581,624

UNITED STATES PATENT OFFICE 2,581,624

EARLY FACTOR MECHANISM

Robert E. Boyden, Los Angeles, and Edward P. Drake, Glendale, Calif., assignors to Clary Multiplier Corporation, Los Angeles, Calif., a corporation of California Original application November 19, 1946, Serial No. 710,880. Divided and this application March 7, 1949, Serial No. 79,954

9 Claims. (Cl. 235—60)

This invention relates to calculating machines of the type capable of performing multiplication as well as addition and subtraction and has particular reference to calculating machines of the reciprocating or rack type.

In calculating machines of the above type employing a keyboard to enter the various factors of a calculation, it frequently occurs that the operator is capable of working ahead of the machine when the latter is performing certain problems, particularly those calling for a sequence of machine operations or in totalling operations wherein the operator has only to initiate the totalling operations. In such cases, the operator must generally wait until the machine substantially completes its operation before he can enter the factor of a new calculation.

Accordingly, the principal object of the present invention is to enable an operator to enter one factor of a calculation in a calculating machine while the machine is operating to solve another calculation.

Another object is to enter a factor of a calculation while or before the result of a preceding calculation is totalled out.

The present invention makes it possible to utilize a reciprocating rack type actuator mechanism to transfer amounts between a keyboard, accumulator, and other units of the machine, and to permit amounts to be set up in the keyboard even though the racks are, in the meantime, operated to control or effect such operations as multiplication or totalling.

The manner in which the above and other objects of the invention are accomplished will be readily understood on reference to the following specification when read in conjunction with the accompanying drawings wherein:

Fig. 1 is a plan view, partly broken away, of a calculating machine embodying the present invention.

Figs. 2 and 3 jointly illustrate a longitudinal sectional view through the machine.

Fig. 4 is a transverse section through a portion of the keyboard.

Fig. 5 is a side elevation showing the mechanism for driving the racks and for controlling the multiplier digit selecting mechanism.

Fig. 6 is a side elevation illustrating part of the accumulator controls.

Fig. 6A is a side elevation showing part of the totalling controls.

Fig. 7 is a fragmentary side elevation showing part of the controls for actuating the zero stops.

Fig. 8 is a side elevation illustrating part of the accumulator controls and the means for coupling the main racks of the partial products accumulator.

Fig. 9 is a detailed view supplementing part of Fig. 8.

Fig. 11 is a side elevation illustrating further controls for the main and multiplier clutches.

Fig. 12 is a detailed view illustrating part of the linkage for controlling the rack stop bars.

Fig. 13 is a side elevation of the controls for effecting an "automatic product" operation.

Figure 1:
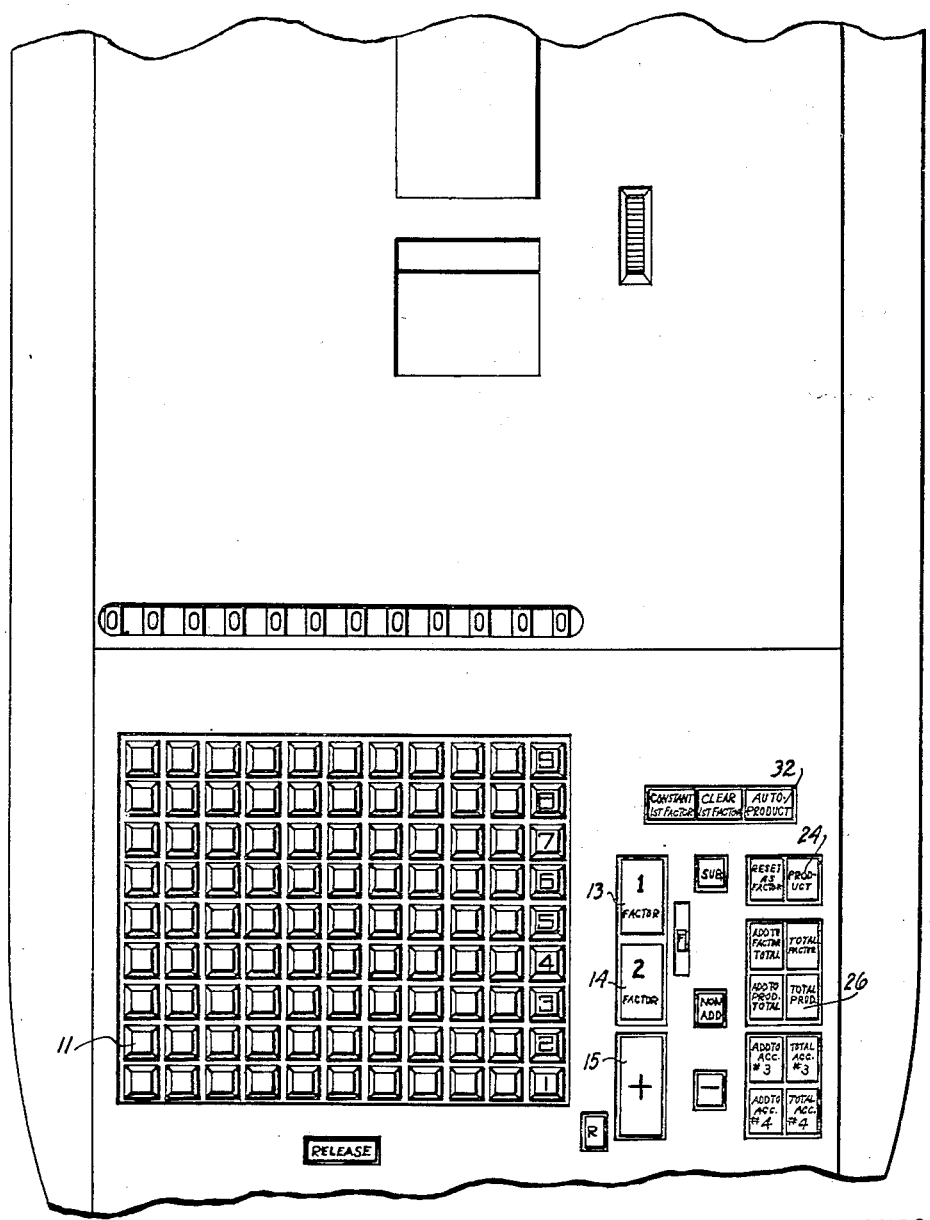

This application is a division of the copending Boyden et al. application No. 710,880, filed Nov. 19, 1946 (issued on July 18, 1950 as Patent No. 2,515,692). Reference is hereby made to said copending application for a complete disclosure of a calculating machine in which the present invention is embodied. It should, however, be understood that the invention may be equally well embodied in other forms of calculating machines.

General description

The machine in which the present invention is embodied is of the reciprocating rack type, utilizing differentially operable reciprocating racks 35 (Figs. 2 and 3) to transfer mechanical representations of values between different operating units of the machine, such as the keyboard, accumulators, multiplying mechanism, etc. A printing mechanism is provided under control of the racks for printing the factors and result of a problem.

Describing first the general arrangement of the controls for the machine, the factor amount entering means comprises a plurality of value keys 11 (Figs. 1 and 2) in which may be set in sequence the various factors of a calculation.

At the right of the keyboard is a group of control bars and keys including a first factor (multiplicand) entering bar 13, a second factor (multiplier) entering bar 14 and an add bar 15, each bar being adapted to cause operation of the machine.

A pair of total bars 24 and 26 are provided which, when depressed, effect totalling from respective ones of a series of accumulators in the machine.

Keyboard

The keyboard is of the flexible type and each amount key 11, when depressed, serves, at certain times, as a stop to differentially limit the movement of an aligned drive rack 35 to an amount depending on the value of the depressed key. Each key comprises a keytop 41 and a keystem 41a guided in aligned slots formed in a keyboard frame comprising a bottom frame 42 (see also Fig. 4) and a top plate 42a secured to the side walls of the bottom frame.

The keys in each bank are yieldably held upward by a tension spring 46 extending along the length of the keyboard. This spring rests upon cross ribs 47 formed across slots 48 in the plate 42a and extends within slots 49 into the keystems.

Means are provided for latching the keys 11 in their depressed positions. Each keystem has a cam lobe 51 formed thereon which, when the key is depressed, rocks a locking bail 52 outward. The latter is pivoted on the frame 42 by trunnion bearings 53 and 54. A spring 55 presses each bail against the series of keystems in its associated bank and at the bottom of the key stroke the cam lobe 51 passes below the bail, enabling the latter to retract partially to latch the key in depressed position.

A zero stop 57 is integrally attached to each locking bail 52 and, is so positioned that when no key 11 in the aligned bank is depressed the bail will hold said zero stop in blocking position directly in front of one of the steps of a rack stop member 100 carried by the associated rack 35. However, when any amount key is depressed and latched down, the locking bail 52 will be held outward sufficiently to retain the associated zero stop out of the path of the member 100.

Racks and rack drive

Referring to Figs. 2 and 3, in particular, each of the various ordinally arranged drive racks 35 is supported for fore and aft movement at the rear by cross shaft 95 embraced by an open slot 96 formed in the rack. At its forward end, each rack is supported by a rack drive shaft 97 suitably guided for fore and aft movement in the machine side frames and movable along a longitudinally extending slot 98 formed in the rack.

According to the present invention, and for the purpose of differentially controlling the extent of travel of the racks 35, there is provided in operative relation to each rack, a rack stop bar 100 formed with equally spaced shoulders 101 adapted, when in a raised position indicated by the dot-dash lines 100a, to engage depressed ones of associated keys. The spacing of the shoulders is slightly larger than the spacing of the stems of the amount keys so that the bar 100 will strike the lower end of a depressed key after the associated rack 35 has moved a number of increments equal to the value of the depressed key.

Each rack stop bar 100 may be moved vertically relative to its drive rack 35 into and out of cooperative relation with the lower ends of depressed ones of the value key stems. For this purpose, each bar 100 is provided with slots 102 and 103 guided over headed pins 104 and 105, respectively, extending from the associated rack.

A cross rod 106 extends through elongated slots 107 formed in the various bars 100, intermediate the slots 102 and 103, and is carried by arms 108 extending from a rockable shaft 110, the latter being rotatably mounted in the machine side frames in a manner not shown and embraced by elongated slots 111 in the various racks 35.

As described hereinafter, the bars 100 are normally, when the machine is at rest, held in a lowermost position illustrated in full lines in Fig. 2, out of cooperative relation with any depressed or undepressed keys 11. During addition or subtraction operations, the bars are raised into their alternate dot and dash line positions 100a during the main portion of such operations. During multiplication operations, the bars 100 are raised at the start of such operation and, after the racks have been advanced to positions limited by depressed ones of the keys, the bars 100 are lowered so as to enable the new factor to be set up on the keyboard while the current multiplication is being performed by the machine. During a totalling operation, the bars 100 are held in their lower inoperative positions so that an amount may be set up in the keyboard either before or during such totalling operation. Thus, an amount may be set up during a multiplication and may be retained in the keyboard even though a totalling operation will be instituted subsequent to a current multiplication operation and before the succeeding multiplication is begun.

Means are provided for yieldably transmitting a drive from a cyclically operable main shaft 8 (Figs. 3, 5, 8, 9, 10, 11 and 13) to the various drive racks 35 to drive the same forward until arrested by the depressed value keys or, during totalling operations, by the associated accumulator elements of an accumulator being totalled. As shown in Fig. 5, a pair of complementary rack drive cams 130 and 131 are keyed to the shaft 8 and operate a cam follower 134 pivoted at 116. A link 135 is connected between one arm of the cam follower and a second arm 136 fastened to a rockable cross shaft 137 to which are also secured a plurality of spaced arms, one of which is shown at 138. Each of the latter arms is connected through a link 140 to the rack drive shaft 97.

Referring to Fig. 2, the elongated slot 98 in each rack drive 35 terminates at its rear end in oppositely disposed notches 145. Each of these notches is normally engaged by a roller 146 mounted on a carrier 147 rockably mounted on the shaft 97. The two drive elements 147 associated with any rack 35 are spring urged in opposite directions by a tension spring 148 connected between the tails of the two elements. This assembly, by forcing the rollers outward, forms a yieldable connection between the rack drive shaft 97 and each of the different drive racks 35.

The aforementioned yieldable rack drive mechanism is disclosed and claimed in the copending application of R. E. Boyden, Serial No. 718,706, filed December 27, 1946 (issued on December 6, 1949 as Patent No. 2,490,200).

Accumulators

The machine includes a main accumulator generally indicated at 36 (Fig. 2) and one or more storage accumulators, one of which is indicated at 3. These accumulators are all of similar construction and are disclosed in detail in said Boyden et al. application Serial No. 710,880. The accumulator construction is also disclosed and claimed in the copending application of E. P. Drake, Serial Number 582,554, filed March 13, 1945 (issued on June 7, 1949 as Patent No. 2,472,696.

During an operation in which amounts are to be additively entered into the main accumulator 36, the latter is lowered to mesh the ordinally arranged accumulator gears 160 thereof with the lower rack sections 162 of the racks 35.

During totalling operations, the accumulator is raised to mesh the gears 160 with rack sections 163 also formed on the racks 35 so that subsequent forward movement of the racks will drive the gears in a counter-clockwise direction.

The main accumulator is carried by a pair of spaced parallel extending shafts 161 and 170, these shafts being guided for vertical movement in slots 174 and 174a, respectively, (Fig. 6) formed in accumulator side plates 175 located on opposite sides of the accumulator. The latter plates are suitably secured to the machine side frames, one of which is shown, at 143.

For the purpose of raising and lowering an accumulator unit in accordance with the type of problem being performed, there is provided on opposite sides of the accumulator a box cam, one of which is shown at 177 in Fig. 6. Each cam is pivoted on a stationary frame stud 178 and has a cam groove 178a therein embracing a roller 179 rotatably mounted on a corresponding end of the shaft 161.

*Accumulator controls*

During additive entries of amounts into the accumulator 36 through the racks 35, the accumulator is meshed with the racks in advance of the forward strokes thereof and is demeshed therefrom at the end of the forward travel of said racks.

Referring to Fig. 6, the accumulator control cam 177 is normally maintained in a centralized position, as illustrated, by centralizer lever 246 pivoted at 247 and urged clockwise by spring 248 to maintain a roller thereon in engagement with a notch 177a on the periphery of an arcuate surface formed on the upper edge of the cam.

Two pins 240 and 241 are mounted on the cam 177 on opposite sides of the pivot 178 and are adapted to be selectively coupled to longitudinally reciprocal actuating bar 76 by a double hook member 242 pivoted to the bar at 243. The bar 76 extends rearwardly, as illustrated in Fig. 8, and is pivotally connected to a cam follower 245 pivoted at 116 (see also Fig. 9). The latter cam follower is provided with a roller 250 which normally rides on the surface of a cam 251 keyed on the aforementioned main shaft 8.

The hook member 242 is connected by a link 254 to a bellcrank 255 pivoted at 256 and normally held in its illustrated position by a centralizer 257. The latter is spring pressed upwardly by a spring 262 and is provided with a pin 260 located within a triangular aperture 261 in the bellcrank to normally hold the bellcrank and hook member 242 in their illustrated neutral positions.

Thus, with the hook member 242 in its neutral position, actuation of the bar 76 will be ineffective to mesh the accumulator 36 with either of the rack sections 162 and 163 (Fig. 2) of the racks 35.

Referring to Figs. 8 and 13, a cam 113 keyed on the main drive shaft 8 is engaged by a roller 114 on a cam follower 115 pivoted at 116. The latter is held in engagement with the cam 113 by a spring 115a and is connected to one end of a link 117, the other end of which is pivotally supported by the lower end of a link 118. The upper end of the link 118 is pivotally supported by a bail 119 pivoted at 571 and normally located in the position illustrated in Fig. 13. Link 117 has a notch 117a therein, normally embracing a pin 120 car-ried on an arm 121 which is fastened to a rockable cross shaft 122.

As shown in Fig. 12, the shaft 122 is fastened to an arm 123 normally urged downward by a spring 124 and connected by a pin and slot connection 125 to arm 126 secured to the aforementioned shaft 110 (see also Fig. 2) which supports the rack stop bar control rod 106. The upper portion of the arm 126 extends above the shaft 110 and moves between a pair of stationary limit pins 127 which limit the vertical positioning of the various stop bars 100.

*Printer*

The racks 35 are normally coupled to a printing mechanism so as to register on said printer amounts transferred by said racks from the keyboard, accumulators, etc.

As shown in Fig. 3, the various racks are provided with rack gear sections meshing with different sets of entrained idlers, one set of such idlers being indicated at 359, 307 and 306. The latter idler is rotatably mounted on a rockable printer arm 301 carried by a printer shaft 302. The idler 306 meshes with a gear 305 also rotatably mounted on the arm 301 and fastened to a printer dial 309 bearing printing characters. During a printing operation, the shaft 302 is rocked clockwise, enabling tension springs 303 to rock certain of the arms 301 to carry the respective dials into printing contact with a record paper carried around a platen 3221.

*Power drive*

Figure 10:
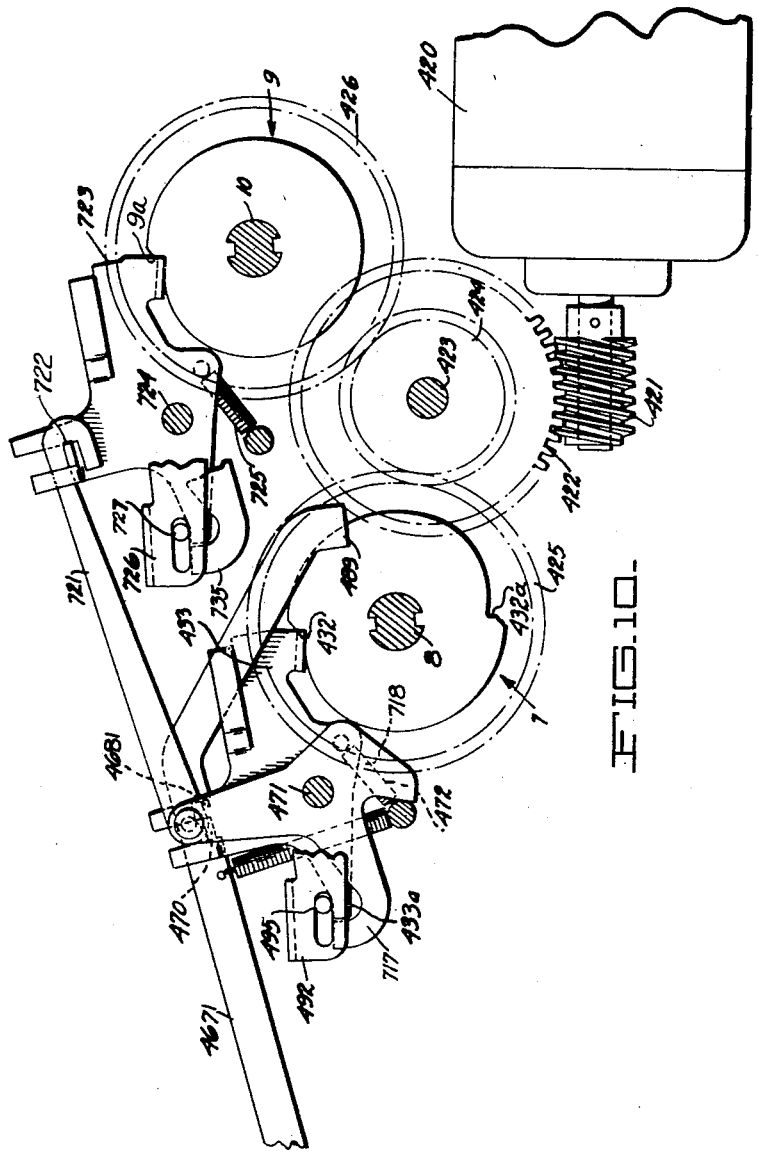
Fig. 10 is a side elevation illustrating part of the controls for the main and multiplier clutches and the motor drive therefor.

The machine is driven by two separate power units operable by a single motor 420 (Fig. 10). One power unit comprises a cyclically operable main clutch 7 which is operatively connected, when engaged, to the main drive shaft 8 for the purpose of operating the main units of the machine during addition and totalling operations as well as during the first and last phases of a multiplication operation. The second power unit comprises a cyclically operable multiplier clutch 9 which is operatively connected, when engaged, to a multiplier drive shaft 10 to operate the multiplier portion of the machine during a multiplication operation. Operation of this second clutch 9 is initiated by the main clutch under control of the second factor bar 14 (Figs. 1 and 14) as an incident to a multiplication operation as will be described in detail hereinafter.

The clutches 7 and 9 are operatively connected to spur gears 425 and 426, respectively, each meshing with a spur gear 424 rotatably mounted on a cross shaft 423 and fastened to a worm gear 422. The latter meshes with, and is driven by, a worm 421 mounted on the motor shaft.

*Addition controls*

In the operation of the machine to perform addition, each factor is successively entered in the keyboard and the add bar 15 (Figs. 1 and 14) is depressed, causing operation of the main clutch through a main cycle.

The stem of the add bar 15 is provided with a vertical slot guided over stationary frame pin 453, and the lower end of the stem is pivotally connected to a bellcrank 454 pivoted at 455, and urged counter-clockwise by a spring 456 to normally hold the add bar in its illustrated raised position. Upon depression of the add bar, a pin 457 (see also Fig. 6) on the bellcrank forces a shouldered link 459 rearward to rock a bellcrank 461 connected thereto clockwise about its pivot 462. The bellcrank 461 is pivotally connected at 463 to a link 464 which, in turn, is connected by a pivot pin 563 to a link 465.

As the link of 464 (Fig. 6) moves downward, a pin 466 thereon moves into engagement with the inclined surface of a triangular aperture 467 formed in a cam plate 468 which for the purpose of the present description may be considered stationary relative to the machine. Thus, the link 464 will be rocked counter-clockwise about its upper pivotal connection 463 to force the link 465 rearward and thereby rock a bail 265 connected thereto about its pivot 266. The bail is connected through a pin and slot connection 264 with the aforementioned accumulator positioning control bellcrank 255, and will rock this bellcrank counter-clockwise to position the hook 242 in engagement with the upper pin 240 of the box cam 177 so that during the subsequent rearward movement of bar 76, the main accumulator will be lowered into mesh with the rack sections 162 of the main racks 35 (Fig. 2) for an additive entry therein.

Figure 14:
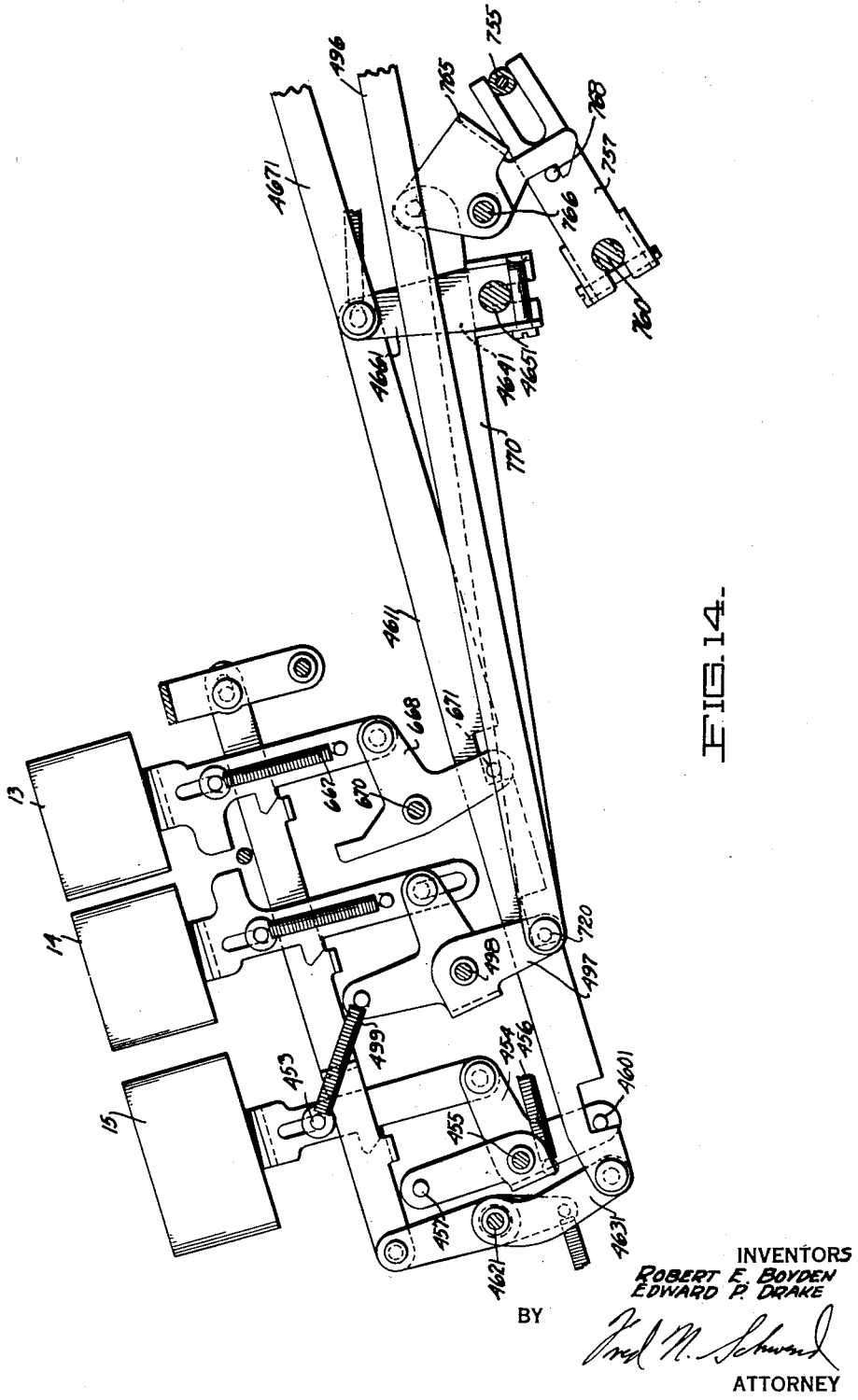
Fig. 14 is a side elevation illustrating part of the machine controls including the add, first factor and second factor bars.

In addition to the conditioning of the main accumulator for an add operation as above described, depression of the add bar 15 causes engagement of the main clutch 7 and operation of the machine. Referring to Fig. 14, the lower arm of the bellcrank 454 is provided with a pin 4601 located within a notch in the clutch control bar 4611. The latter is supported for lengthwise movement on swinging arms 4631 and 4641, the latter being fastened to a rockable shaft 4651 to which is also fixed a second arm 4661 connected to the link 4671 (see also Fig. 10). Link 4671 is provided with a notch 4681 normally embracing an ear 470 on a main clutch control lever 433. The latter is pivoted at 471 and normally urged clockwise into engagement with the main clutch 7 by a spring 472 to maintain the latter in disengaged condition. However, upon depression of the add bar, the link 4671 will rock the lever 433 counter-clockwise to cause engagement of the main clutch.

The clutch lever 433 is capable of arresting operation of the main clutch at the end of 180° of rotation, or the first phase thereof as occurs in multiplication operations, but during addition operations this is prevented and the main clutch will remain in operation for a complete cycle. For this purpose, a camming lever 492 (Figs. 10 and 11) is also pivoted at 471 and urged clockwise to its illustrated position by a spring 493. A slot 494 is formed in the lever 492 to guide a pin 495 carried on a link 496 which, during addition operations, is allowed to remain in its rearmost illustrated position wherein the pin 495 overlies a tail 433a of the clutch control lever 433. Shortly before the midcycle position of the clutch is reached, a camming member 481 on the main shaft 8 carries an ear 501 thereof against a camming edge 502 of the lever, thereby rocking the latter counter-clockwise to force the pin 495 against the tail of the clutch control lever 433. The latter will be rocked outward away from the clutch 7 so that it will be ineffective to engage an arresting shoulder 432a to arrest the clutch in this midcycle position. Thus the clutch will continue throughout the remainder of its cycle, at the end of which it will engage a shoulder 432 on the clutch to arrest the same.

Totalling controls

The main accumulator 36 may be totalled out by depressing its respective total bar 26 (Figs. 1 and 6).

Referring to Fig. 2, the main accumulator includes a series of ordinally spaced zero stop levers 552 keyed on the aforementioned accumulator shaft 170. These levers are rocked counter-clockwise by the shaft 170 during a totalling operation to locate blocking noises thereon in blocking relation to ears 553 integral with the various accumulator gears 160 so that as the accumulator is driven in a subtractive direction by the various racks, the gears will return to zero registration and block forward movement of the racks as the latter reach positions indicative of the total previously registered on the accumulator.

The total bar 26 is normally held in raised position by a spring 556 and, upon depression thereof, rocks a bellcrank 558, pivoted at 559, to draw a shouldered link 560 connected thereto forwardly. The latter is provided with an elongated slot guided over a stationary pin 561 and, during such forward movement, its shoulder 562 engages the aforementioned pivot pin 563 to draw the link 465 forwardly and thus, through bail 265 and bailcrank 255, lower the hook 242 into engagement with the pin 241 of box cam 177. Thus, during a subsequent rearward movement of the bar 76, the cam 177 will act to raise the main accumulator into a subtractive or totalling engagement with the rack gear sections 163 of the racks 35.

As shown in Fig. 7, the aforementioned shaft 170 carrying the various zero stop levers 552 is normally held in a clockwise rocked position by a spring 579 acting on an arm 580 attached to the shaft 170. The second arm 575, also attached to the shaft 170 is provided with an ear underlying a hooked member 576 and, when the accumulator is raised, the arm 575 will fulcrum about the hooked portion of the member 576 to rock the shaft 170 counter-clockwise and thus position the various zero stop levers 552 (Fig. 2) in blocking relation to the accumulator gears.

In order to enable the total bar 26 to cause engagement of the main clutch and operation of the machine, a pin 564 is mounted on the bellcrank 558 and lies in front of a shoulder on a clutch control link 565 supported for lengthwise movement at its forward end by a swinging arm 567 and at its rearward end by a bellcrank 570 (Fig. 13) pivoted at 571 and provided with pin 572 overlying an arm 573 fixed on the shaft 4651 (see also Fig. 14) to which the aforementioned clutch control arms 4641 and 4661 are also fastened. Thus rearward movement of the link 565, will through the bellcrank 570 and arms 573 and 4661 actuate the clutch control link 4671, causing engagement of the main clutch to complete a main cycle of the machine.

An ear 570a of the bellcrank 570 underlies the aforementioned bail 119. Thus, upon depression of the total bar 26, and consequent rearward movement of the link 565, the bail 119 will be rocked upward to raise the links 117 and 118 to release the former link from its connection with the rack stop bar control arm 121. Therefore, the rack stops 100 (Fig. 2) will remain in their lowermost illustrated positions during the totalling operation, enabling a factor to be set up in the keyboard during or even before that type of operation.

Multiplication controls

In performing a multiplication, the first factor (multiplicand) is set up in the keyboard and the first factor bar 13 is depressed to enter such factor in the machine. The latter bar is normally held in its raised position shown in Fig. 14 by a tension spring 667 and is connected to a bellcrank 668 pivoted at 670 and provided with a pin 671 extending into a notch formed in the aforementioned clutch control bar 4611. Thus, depression of the bar 13 will actuate control bar 4611 to cause engagement of the main clutch for a complete cycle of operation in the same manner as occurs in addition operations.

Upon depression of the bar 13, and after the racks 35 move forward, a shaft 702 (Fig. 2), carrying a series of ordinally arranged coupling gears 703 meshing with vertical racks 40, is lowered to its dot and dash line position 702a. During this movement of shaft 702, the gears 703 roll into mesh with idler gears 706. The latter are rotatably mounted on the stationary shaft 707 and mesh with rack sections 705 formed on the racks 35. Therefore, as the racks 35 are returned to their home positions, they will through the gears 703 and 706, vertically adjust the racks 40 to positions mechanically representing the values of the various multiplicand digits. Each rack 40 has a horizontally extending slot 742 therein which guides a contact element 654 (Fig. 3). The multiplicand racks remain in their adjusted positions throughout the ensuing multiplication operation and thus form the multiplicand receiving device.

During the foregoing first factor entry operation, the control bar 565 (Figs. 6 and 13) is not actuated; therefore the notch 117a of link 117 will remain in embracing engagement with the pin 120 on the rack stop control arm 121 throughout the operation. Therefore, the rack stop bars 100 (Fig. 2) will be actuated by the cam 113 and held in their upper effective positions until the end of the cycle.

The multiplier (second factor) of a multiplication is entered in the machine subsequent to the entry of the multiplicand by setting this factor in the keyboard and depressing the second factor bar 14 which causes the power drive mechanism to advance the racks 35 amounts controlled by depressed value keys and thereby mechanically represent the different digits of the multiplier. These racks remain in said positions throughout the ensuing multiplication operation. Thus the racks 35, at this time, form the multiplier receiving and storing device.

The second factor bar 14 also initiates the multiplication operation by conditioning the main clutch 7 (Fig. 10) to initiate operation of the multiplier clutch 9 and to become arrested at the end of a 180° of rotation or at the end of the first phase thereof. The multiplier clutch 9 causes sequential sensing and selection of various ones of the previously set racks 35, starting with the rack in the order of lowest denominational value containing a significant multiplier digit, to control multiplication in accordance with the value of said digit. The sequential selection of the different racks 35 is accomplished by a selector device generally indicated at 653 (Fig. 2). The latter is effective to position a contact carriage 5 in a fore and aft position.

Referring to Fig. 14, the stem of bar 14 is connected to a bellcrank 497 and is normally held in a raised position by a spring 499 acting to hold the bellcrank in a counterclockwise position about its pivot 498. The bellcrank 497 is connected by a pivot pin 729 to the aforementioned link 496 (see also Fig. 11) and, upon depression of the bar 14, the link positions its pin 495 in the forward end of the slot 494 of lever 492 wherein it overlies the tail of a bellcrank 717 (see also Fig. 10) which is pivoted at 471 and urged clockwise into its illustrated position by tension spring 718. The bar 14, when depressed, is held in that position throughout the multiplication operation to consequently maintain the pin 495 over the tail of bellcrank 717 until the end of the operation.

The pivot pin 720 of bellcrank 497 (Fig. 14) also extends into a notch in the aforementioned clutch control bar 4611 so that as the second factor bar 14 is depressed, this pin will actuate clutch control bar 4611 to cause engagement of the main clutch.

Toward the end of the first 180° of movement of the main clutch, the member 491 (Fig. 11) will cam the lever 492 counter-clockwise causing the pin 495, which is now located over the tail of bellcrank 717, to likewise rock the latter. Bellcrank 717 is connected by a link 721 to an ear 722 of a multiplier clutch control lever 723, and therefore, at this time the link will rock the lever 723 counterclockwise about its pivot 724 and the action of a tension spring 725 to cause engagement of the multiplier clutch 9. The multiplier clutch will thereafter operate through a number of revolutions or cycles depending on the number of significant digits in the multiplier factor as will appear hereinafter.

A lever 726, similar to lever 492, is pivoted at 724 and is urged clockwise by a spring 736 to limit against a frame stud 726a. The lever is provided with an elongated slot which guides a pin 727 carried by link 728 pivotally connected to a bellcrank 729 which is fulcrumed at 731. The latter bellcrank is urged clockwise by a spring 732 to normally hold the pin 727 in its rearward illustrated position wherein it overlies the tail of the clutch control lever 723.

Keyed on the multiplier shaft 10 is a member 733 having an ear 734 which will cam the lever 726 counter-clockwise just prior to the end of a multiplier clutch cycle, thereby normally causing the pin 727 to hold the clutch lever 723 away from the periphery of the clutch disc as the full cycle arresting shoulder 9a moves past the same to thereby reinitiate a new clutch cycle. This recycling of the multiplier clutch will continue until the multiplicand has been multiplied by each significant digit of the multiplier at which time the bellcrank 729 will be rocked counterclockwise as will be described hereinafter to position the pin 727 in the forward end of the slot in lever 726 and in a position overlying the tail of a bellcrank 735. As the clutch approaches the end of its final cycle the member 733 will again rock the lever 726 but, since the clutch lever 723 is not held away from the periphery of the clutch at this time, the clutch will be automatically disengaged. On the other hand, the bellcrank 735 will be rocked by pin 727, forcing a link 738 connected thereto forwardly to cause a bent over projection 738a thereon to engage the ear 470 (see also Fig. 10) of the main clutch control lever 433 to rock the latter and thus reengage the main clutch to cause it to operate through its second 180° of operation.

As previously mentioned, during multiplication only one of the racks 35, representing one of the multiplier digits, is in control at any one time and such racks control fore and aft positioning of the multiplier carriage 5, the latter comprising a pair of laterally extending rods 745 and 746 supported in longitudinally disposed slots, one of which is shown at 747, in the machine side frames. A plurality of ordinally arranged plates 744, supported by the rods 745 and 746, have vertical slots 743 therein embracing the aforementioned contact elements 654 so as to move the same horizontally along the slots 742 of the associated racks 40.

As described in detail in said Boyden et al. application Serial No. 710,880, the positioning of the various multiplicand racks 40 and the multiplier carriage 5 coordinately set the contact elements 654 to contact certain of a series of coordinately arranged terminals, as at 6550, and thereby condition respective ones of a plurality of ordinally arranged groups of circuits connected between the terminals (6550) and different ones of a series of terminal strips (6560) in accordance with the partial products of the multiplication tables. The latter circuits control actuation of a partial product accumulator generally indicated at 6 (Fig. 3).

The partial products circuits in each order are divided into two groups, one to control registration of the units component of a partial product and the other to control registration of the tens component of the same partial product. These two groups of circuits are mounted on separate plates located on opposite sides of the contact elements 654, one of said plates being illustrated at 820.

The accumulator 6 is driven by a constant excursion drive carriage, generally indicated at 659, through differentially movable units and tens actuating racks generally indicated at 657 and 658, respectively. The latter jointly and simultaneously differentially drive the accumulator 6 and are so arranged relative to the partial product circuits that a tens component actuator rack under control of the tens component partial product circuit in any one main rack order and the units component actuator rack under control of the units component partial product circuit in the next higher order main rack order jointly control a particular order of the partial products accumulator so that the partial products of a multiplication may be simultaneously and properly entered into the accumulator.

The accumulator 6, which is disclosed in detail in said Boyden et al. application Serial No. 710,880, comprises a series of ordinally arranged gears 940, each in mesh with a compound gear 862—863, the latter being adapted to be driven by a differential rack 1864. Each rack 1864 is provided with a pinion 867 meshing with an aligned upper rack 657 and a lower rack 658. These racks are driven by the carriage 659 through arms 872 and 875 pivotally carried by the carriage and provided with notches 887 arranged to be spring pressed into embracement with pins 871 extending from the racks 657 and 658.

Electromagnetically controlled means are provided for releasing the arms 872 and 875 from their respective arms 891 and 892 when the associated accumulator gear 940 has reached its proper position. This means comprises release arms 891 and 892 loosely mounted on shafts 893 and 894, respectively. Each pair of arms 891 and 892 are urged toward each other by a spring 895, extending there-between. However, these arms are normally held outwardly by latches 897, each forming the armature of an electro-magnet 660 or 661. When a current impulse is applied to the winding of one of said magnets, said magnet will cause its latch to release the respective arm 891 or 892, allowing the same to move inwardly to disengage its associated arm 872 or 875 from coupling relation to the pin 871 on the aligned rack. At the same time, the arm will engage one of a series of serrations 918 formed on its associated rack, thus locking it into place.

The electro-magnets 660 and 661 are placed in circuit in a suitable manner (not shown) with contact rollers 662 and 663 connected to the drive carriage 659 by arms 888 and 890, respectively, and are movable along the terminal strips (6560) for the units and tens partial product circuits, respectively. Thus, when a roller 662 or 663 contacts the terminal strip of a conditioned partial product circuit it will complete a circuit through the same and through the associated electromagnet 660 or 661 to arrest the associated rack 657 or 658.

*Means for sequentially setting contact carriage in accordance with different multiplier digits*

As previously described, multiplication is performed by successively multiplying all digits in the multiplicand by successive digits of the mutiplier, i. e., by one multiplier digit during each multiplication cycle. Consequently, means is provided for sequentially causing successive ones of the rack 35 to control fore and aft positioning of the contact carriage 5.

Referring to Fig. 2, a vertically shiftable control plate 754 extends across the various orders of the machine and is suitably guided in a manner not shown for vertical movement. The plate 754 is guided in a parallel motion on opposite sides by yoked arms 757 (Fig. 14) and 758 (Fig. 5) embracing rollers 755 and 756, respectively, on the plate. The arms 757 and 758 are attached to a rockable shaft 760 to which is also fixed and arm 761 urged clockwise by a spring 762 whereby to urge the plate 754 downwardly.

As shown in Fig. 5, a yoked arm 763 is pivoted to one arm of the aforementioned cam follower 134 and embraces a roller 764 on the arm 761. The arm 763 and follower 134 form a toggle which, when the main clutch is in full cycle position, holds the yoked arm against the roller 764 to maintain the plate 754 in its raised position. During a main clutch cycle, the cam follower will rock counter-clockwise moving the arm 763 to a position illustrated by the dot and dash lines 763a. During operation of the multiplication instrumentalities of the machine, i. e., the multiplier clutch 9 (Fig. 10) the main shaft 8 will be held in a half cycle position and thus will retain the arm 763 in its lowermost position so as to allow the plate 754 to move downward under control of the selecting devices 653 as will appear presently. It is the downward movement of the plate 754 which causes the selection of successively higher order racks to control multiplication as well as to cause termination of a multiplication operation.

A second device is provided to prevent downward movement of the plate 754 except during multiplication. As shown in Fig. 14, a latch 765 is pivoted at 766 and is connected to the second factor bar operated bellcrank 497 by a link 770. Upon depression of the bar 14 to institute a multiplication operation, the link 770 will cause latch 765 to disengage from a pin 768 on the arm 757 to release this latter, permitting the plate 754 to move downwardly when the main shaft is rotated sufficiently to cause the cam follower 134 (Fig. 5) to permit this action.

As disclosed in said Boyden et al. application Serial No. 710,880, the plate 754 is provided with a series of ordinally arranged notches one of which is indicated at 774 (Fig. 2), said notches being arranged in echelon or progressing upwardly from the right or lowermost decimal order. The path of movement of each notch is located in alignment with a nose 775 of an advance sensing lever 776 pivoted at 777 and urged counter-clockwise by a spring 778.

The advance sensing lever 776 as well as a juxtaposed selection control lever 780 also pivoted at 777 and urged counter-clockwise by a spring 778 are normally held outward is positions illustrated in Fig. 2 by a bail 781 pivotally supported at 782 (Fig. 5) on the machine frames 143. The bail is connected by a link 783 (see also Fig. 8) to a cam follower 784, pivoted at 1785 and urged counter-clockwise by a spring 785 to maintain a roller 786 thereon against the cam 113. Upon movement of the main shaft 8 into its half cycle position, the cam 113 will permit bail 781 to retract, permitting the lever 776 and 780 in each order to move rearwardly. However, the nose 775 of one only of the sensing levers 776 will be able to locate within the notch 774 of the plate 754, and the noses of other levers 776 will merely move into engagement with the surface of the plate, either above or below the associated notch depending on the vertical position of the plate 754 at that time.

Each of the selecting levers 780 also has a nose 786 thereon adapted to move into the aligned notch 774 in the plate 754 after the associated advance sensing lever has moved inward to block the downward movement of the plate.

The levers 776 and 780 are provided with pear shaped slots 793 and 794 respectively, therein through both of which (in each order) extends a pin 795 mounted on the lower end of a cam link 796. The upper end of the link carries a pin 797 which is slidable in a vertical slot 798 in the associated contact carriage plate 744 and extends into a triangular camming aperture 800 in the associated rack 35.

The pin 795 in the lower end of each link 796 also extends through an arcuate slot 801 formed in a lever 802 securely fastened to a rockable shaft 803. The slot 801 is provided with a shoulder 804 under which the pin 795 is urged by a spring 805, the latter also being effective to normally maintain the link 796 in its uppermost illustrated position. However, the slot 794 in lever 780 normally prevents the pin from moving to a position under the shoulder 804 unless the two levers 776 and 780 are allowed to rock into their blocking relationship with the plate 754.

The various arms 802 are oscillated clockwise from and to the positions illustrated in Fig. 2 once during each multiplying cycle. This is effected by an arm 810 (Fig. 5) fastened to shaft 803 and connected by a link 811 to a cam follower 812 pivoted at 813 and held in engagement with a cam 816 on the multiplier shaft 10 by a spring 814.

Toward the end of the downward stroke of a lever 802 which is driving its associated link 796, the pin 795 of the link will cam first along the rearward edge of the slot 794 and thereafter along the slot 793 in the lever 776, in lever 780 drawing these levers out of their blocking positions relative to the plate 754 so that the latter will be free to move downward until blocked by the sensing and selecting levers 776 and 780 of the next higher order which contains a significant multiplier digit. If there be no higher order significant digit, the plate 754 will move to its lowermost position and in doing so will rock the shaft 760 to such an extent as to cause an arm 1080 (Fig. 11) thereon to engage and rock the aforementioned bellcrank 729 counterclockwise, drawing the link 728 forward to position the pin 727 over the tail of the lever 735 so as to cause arrest of the multiplier clutch and reengagement of the main clutch in the manner described hereinbefore to complete its cycle.

*Entry of new factor during multiplication*

In accordance with the present invention, means are provided for enabling a factor of a new multiplication problem to be entered into the keyboard while a current multiplication problem is being carried on so as to obviate the necessity of waiting until the completion of a multiplication problem before setting up the factor of a new problem.

Referring to Figs. 11 and 13, a lever 1097 is pivoted at 724 and is connected by link 1098 to a bellcrank 995. The latter is pivoted at 571 and has an ear 996 thereon underlying an arm of the aforementioned bail 119. At the start of a main clutch operation it will be recalled that the cam 113 will, through the cam follower 115, force the link 117 forward to rock the arm 121 and thereby raise the rack stop bars 100 (Fig. 2) into effective position. Thus, when the main clutch is arrested in half cycle position, the cam 113 will continue to hold the rack stop control link 117 forward and the rack stop bars in raised position. However, at the start of a multiplier clutch operation, the ear 734 on the arm 733 will rock lever 1097 to likewise rock the bellcrank 995 clockwise against the action of a spring 995a and thereby raise the link 118 as well as the forward end of link 117 to move the notch 117a out of cooperative relation with the rack stop control arm 121. This will permit the rack stop bars 100, under the urge of spring 124 (Fig. 12), to return to their normal ineffective positions.

*Partial product accumulator totalling controls*

At the conclusion of a multiplication operation, and assuming that the automatic controls (to be described later) are not effective, the product of a multiplication will be registered on the various gears 940 of the partial product accumulator 6. In order to total out this accumulator and to print the product, the product bar 24, (Figs. 1 and 13) is depressed.

The product bar is normally held in a raised position by spring 956 and when depressed rocks a bellcrank 957 pivoted at 958 and to cause the pin 960 thereon to force the aforementioned clutch control bar 565 rearward and thereby engage the main clutch to cause operation of the machine through a complete main cycle as described hereinbefore. As mentioned hereinbefore, actuation of the clutch control bar 565 will rock bellcrank 570 to remove the link 117 from coaction with the rack stop bar control arm 121. At the same time, depression of the bar 24 causes the pin 961 to rock a second bellcrank 959 clockwise about its pivot 962 to act upon a link 964 and thus rock a bail 965 (see also Fig. 8) clockwise about its pivot 966. A pin 967 on the bail is fitted within an angular slot formed in a link 968 connected to a lever 970 which is pivoted at 971 and connected, in turn, by a link 972 to an arm 973, the latter being fixed to a rockable rack support shaft 95 (see also Fig. 3) and urged in a clockwise direction by spring 974.

As the bail 965 is rocked clockwise upon depression of the product bar 24, the pin 967 will cam the link 968 downwardly to locate the vertical leg of an L shaped slot 975 over a pin 976 mounted on the upper leg of the aforementioned bellcrank 245. Therefore, during operation of the machine under control of the product bar 24, cam 251 will be effective to rock the shaft 95 counter-clockwise. The latter shaft has ordinally arranged flattened sections 977a thereon, each of which overlies the lower edge of a slot provided in an auxiliary rack 977 connected by pin and slot connections 978 and 979 to the associated rack 35. The auxiliary rack 977 is normally held in its illustrated elevated position by a spring 981 and connected to a pin 982. However, as the shaft 95 is rocked counter-clockwise, each flattened section 977a thereon will cam its associated rack 977 downward to mesh the teeth thereof with an idler 944 meshing with the associated accumulator gear 940 to operatively connect the racks 35 with the accumulator 6 so that values therein may be totalled out and printed.

The flattened portions 977a of the shaft 95 are also aligned with zero stops 983 pivoted at 931 and spring urged counter-clockwise in a suitable manner. Each zero stop has a shoulder 985 thereon adapted to be positioned in blocking relation with one of a pair of diametrically opposed pins 986 mounted on the associated idler 944. Consequently, during the ensuing forward movement of the racks 35 during a totalling operation, each of the racks will move forward until arrested by virtue of one of the pins 986 being blocked in zero position by the associated zero stop lever 983.

*Automatic product controls*

A product registered on the partial product accumulator 6 may be automatically totalled out and printed at the end of a multiplication operation by pre-depressing an automatic product key 32 (Figs. 1 and 13). The latter, when depressed, is latched in depressed position in a suitable manner.

The key 32 is provided with a pin 987 on the stem thereof which underlies one arm of a bellcrank 988 pivoted at 990 and connected by a link 991 to a bellcrank 992 pivoted at 116. Normally, when the automatic product key 32 is held in its illustrated raised position, the pin 987 will hold the bellcrank 988 in a position (as shown) wherein a retaining shoulder 993 thereon will be out of the path of a pin 994 on the aforementioned arm 995.

The bellcrank 988 is connected by pin and slot connection 997 to a link 998 which, in turn, is connected to the outer arm of a bail 740 (see also Fig. 11), supporting the forward end of the aforementioned link 738.

As the key 32 is depressed, the bellcrank 988 will be allowed to rock counter-clockwise, lowering the link 998 until an ear 1000 thereon engages and rests on the upper end of a bail 1001 pivoted on the aforementioned shaft 760 which, it will be recalled, is operatively connected to the multiplier digit selecting plate 754 (Fig. 2). The bail 1001 is urged clockwise by spring 1003 to yieldably hold an arm 1004 thereof against an arm 1005 fixed to the shaft 760.

During a multiplication operation, and as the selection plate 754 moves downward, causing arms 757 (Fig. 14) and 758 (Fig. 5) to rock shaft 760 clockwise, the bail 1001 will follow the arm 1005 rearward until it passes out from under the ear 1000 of the link 998 allowing the latter to drop until the forward end of the bellcrank 988 rests on the pin 994. As the multiplier clutch cycles the ear 734 (Fig. 11) on the piece 733 will engage and rock the lever 1007 which through the link 1008 (Fig. 13) will rock bellcrank 995 until its pin 994 moves past the retaining shoulder 993 so as to allow the bellcrank 988 to latch bellcrank 995 in its clockwise rocked position. The bellcrank 995 will therefore, through its ear 996, hold the bail 119 elevated to retain the notch in the link 117 above the pin 120 so that thereafter the rack stop bars 100 (Fig. 2) will be allowed to remain in the lowermost positions where they will be ineffective to interfere with the setting up of a new factor in the keyboard while the multiplication and subsequent totalling of the product is proceeding.

During the second phase of the main clutch cycle following completion of a cycling of the multiplier cluch in a multiplying operation, the mechanism illustrated in Fig. 5 will return the multiplier selection plate 754 to its upper home position, rocking the arm 1005 (Fig. 13) counter-clockwise. The latter arm will in turn rock bail 1001 to engage the rear edge of ear 1000 and thus force the link 998 forward. The latter is now so located that its forward end lies directly behind pin 1010 forming the pivot between the bellcrank 959 and the link 964. Consequently, forward movement of the link 998 will likewise draw the link 964 leftward, rocking the bail 965 (see also Fig. 8) to cause the pin 967 thereon to lower the link 968 so as to couple the link 968 to the bellcrank 245 whereby to enable the cam 251 to operatively connect the main racks to the partial product accumulator in a manner described in the preceding section so as to effect the totalling operation of the partial product accumulator. Also, leftward movement of the link 998 will cause the bail 740 (see also Fig. 11) to actuate the link 738 (see also Fig. 11) and thus cause reengagement of the main clutch and operation of the machine through a totalling operation.

During this time the bellcrank 995 (Fig. 13) will be retained in a clockwise rocked position by the latching shoulder 993 of bellcrank 988 thereby retaining the link 117 out of cooperative relation with the rack stop control arm 121. However, toward the end of the automatic totalling operation, the ear 501 of the member 491 will rock the bellcrank 992 which, through the link 991, will rock the bellcrank 988 sufficiently to release the bellcrank 995, permitting the parts to assume their normal positions.

Having thus described the invention what we desire to secure by United States Letters Patent is:

1. In a calculating machine, the combination of registering mechanism, a keyboard including a plurality of settable value keys, actuating mechanism for said registering mechanism including differentially movable elements adapted to be controlled by set ones of said keys; said differential elements being normally out of register with set ones of said keys, cyclically operable drive means for said actuating mechanism, control means including a first device for moving said elements into register with depressed ones of said keys, a second device operable by said drive means and normally operatively connected to said first device for actuating the same, total taking means effective to cause operation of said drive means to actuate said differential elements to take a total from said registering mechanism, and means responsive to actuation of said total taking means for operatively disconnecting said first and second devices.

2. In a calculating machine, the combination of registering mechanism, actuating mechanism therefor including differentially movable elements; a keyboard including a plurality of settable value keys for controlling the extent of movement of said differential elements; said elements being normally out of cooperative relation with set ones of said keys, multiplication control mechanism, a multiplication initiating device therefor, means responsive to operation of said initiating device for causing said differential elements to cooperate with set ones of said keys, and means operable in response to operation of said multiplication control mechanism for rendering said elements ineffective to cooperate with set of said keys.

3. In a calculating machine, the combination of registering mechanism, actuating mechanism therefor including differentially operable elements; a keyboard including a plurality of settable value keys for controlling the extent of movement of said differential elements; said elements being normally out of cooperative relation with set ones of said keys, a first cyclically operable device for causing actuation of said differential elements, means responsive to operation of said device for moving said differential elements into cooperative relation with set ones of said keys, a second cyclically operable device operable in response to operation of said first device, and means responsive to operation of said second device for moving said differential elements out of cooperative relation with set ones of said keys.

4. In a calculating machine, the combination of registering mechanism, actuating mechanism therefor including differentially movable elements, a keyboard including a plurality of settable value keys for controlling the extent of movement of said differential elements, said elements being normally out of cooperative relation with set ones of said keys, a first cyclically operable device for causing actuation of said differential elements, means responsive to operation of said device for moving said differential elements into cooperative relation with set ones of said keys and for holding said differential elements in said cooperative relation, a second cyclically operable device operable in response to operation of said first device, and means responsive to operation of said second device for releasing said holding means.

5. In a calculating machine, the combination of registering mechanism, actuating mechanism therefor including differentially movable elements; a keyboard including a plurality of settable value keys for controlling the extent of movement of said differential elements; said elements being normally out of cooperative relation with set ones of said keys, a first cyclically operable device for causing actuation of said differential elements, means responsive to operation of said device for moving said elements into cooperative relation with set ones of set keys and for holding said differential elements in said cooperative relation, a second cyclically operable device operable in response to operation of said first device, means responsive to operation of said second device for releasing said holding means, selectively settable latch means responsive to operation of said last mentioned means for latching said holding means in releasing position, and means responsive to subsequent operation of said first device for releasing said latch means.

6. In a calculating machine, the combination of registering mechanism, actuating mechanism therefor including differentially movable elements; value selecting devices settable to differentially limit movement of said differential elements, said elements being normally out of cooperative relation with set ones of said keys, multiplication control mechanism including a clutch, a mutliplication initiating device including a second clutch operable to cause initiation of operation of said first mentioned clutch, means operable by said second clutch for causing said differential elements to cooperate with set ones of said keys, and means operable by said first mentioned clutch for rendering said differential elements ineffective to cooperate with set ones of said keys.

7. In a calculating machine, the combination of registering mechanism, actuating mechanism therefor including differentially movable elements; value selecting devices settable to differentially limit movement of said differential elements, means normally maintaining said elements out of cooperative relation with set ones of said value selecting devices, multiplication control mechanism including a clutch, a multiplication initiating device including a second clutch operable to cause initiation of operation of said first mentioned clutch, means operable by said second clutch for positioning said differential elements in cooperative relation with set ones of said value selecting devices, and means operable by said first mentioned clutch for rendering said first mentioned means effective.

8. In a calculating machine, the combination of registering mechanism, actuating mechanism therefor including differentially movable elements; value selecting devices settable to differentially limit movement of said differential elements, said elements being normally out of cooperative relation with set ones of said keys, multiplication control mechanism including a clutch, a multiplication initiating device including a second clutch operable to cause initiation of operation of said first mentioned clutch, means operable by said second clutch for causing said differential elements to cooperate with set ones of said keys, means operable by said first mentioned clutch for rendering said differential elements ineffective to cooperate with set ones of said keys, totalling controls for causing said actuating mechanism to total values from said registering mechanism, said totalling controls including means for causing operation of said second mentioned clutch, and means controlled by said totalling controls for disabling said first mentioned means.

9. In a calculating machine, the combination of registering mechanism, actuating mechanism therefor including a plurality of differentially movable racks, rack stops carried by said racks, value selecting devices settable to differentially limit movement of said rack stops whereby to limit movement of said racks, means for causing said actuating mechanism to advance said racks, multiplication control mechanism including a clutch, said multiplication control mechanism also including a device for initiating operation of said means and for causing said means to initiate operation of said clutch, means normally retaining said rack stops out of cooperative relation with set ones of said value selecting devices, means responsive to operation of said first mentioned means for positioning said rack stops in cooperative relation with set ones of said value selecting devices, and means operable by said clutch for releasing said rack stops from said positioning means.

ROBERT E. BOYDEN.
EDWARD P. DRAKE.

REFERENCES CITED

The following references are of record in the file of this patent:

UNITED STATES PATENTS

| Number | Name | Date |
|---|---|---|
| 1,484,237 | Rauchwetter | Feb. 19, 1924 |
| 1,609,335 | Wales | Dec. 7, 1926 |
| 1,874,805 | Robertson | Aug. 30, 1932 |
| 1,912,874 | Walter | June 6, 1933 |
| 2,087,182 | Crosman | July 13, 1937 |
| 2,269,931 | Fettig | Jan. 13, 1942 |
| 2,303,692 | Hellgren | Dec. 1, 1942 |
| 2,374,333 | Crosman | Apr. 24, 1945 |
| 2,467,441 | Noller et al. | Apr. 19, 1949 |
| 2,525,423 | Nolde | Oct. 10, 1950 |